(12) United States Patent
Cheng

(10) Patent No.: US 7,701,968 B2
(45) Date of Patent: Apr. 20, 2010

(54) DEVICE AND METHOD THEREOF FOR TRANSMITTING A MAC SERVICE DATA UNIT IN A NETWORK SYSTEM

(75) Inventor: Sheng-Yuan Cheng, Hsin-Chu Hsien (TW)

(73) Assignee: Infineon Technologies Taiwan Co., Ltd., Hsin-Chu (TW)

( * ) Notice: Subject to any disclaimer, the term of this patent is extended or adjusted under 35 U.S.C. 154(b) by 1643 days.

(21) Appl. No.: 10/709,992

(22) Filed: Jun. 11, 2004

(65) Prior Publication Data

US 2005/0094614 A1    May 5, 2005

(30) Foreign Application Priority Data

Oct. 30, 2003    (TW)    ................ 92130341 A

(51) Int. Cl.
    *H04J 3/16*    (2006.01)
(52) U.S. Cl. .................. 370/466; 370/338; 370/401; 370/331; 455/450; 455/452.2
(58) Field of Classification Search .................. 370/329, 370/338, 466, 473, 401, 469, 476, 331, 328; 455/41.2, 450–452.2
    See application file for complete search history.

(56) References Cited

U.S. PATENT DOCUMENTS

| | | | | |
|---|---|---|---|---|
| 5,748,633 A | * | 5/1998 | Lawler et al. ................ | 370/401 |
| 6,205,486 B1 | * | 3/2001 | Wei et al. ................ | 709/233 |
| 7,039,068 B1 | * | 5/2006 | Halasz ................ | 370/473 |
| 7,313,147 B2 | * | 12/2007 | Cheng ................ | 370/414 |
| 7,382,788 B2 | * | 6/2008 | Furey et al. ................ | 370/401 |
| 7,426,177 B2 | * | 9/2008 | Geile et al. ................ | 370/206 |
| 7,433,314 B2 | * | 10/2008 | Sharma et al. ................ | 370/236 |
| 7,447,185 B2 | * | 11/2008 | Trainin ................ | 370/338 |
| 7,453,904 B2 | * | 11/2008 | Seto ................ | 370/466 |
| 7,463,642 B2 | * | 12/2008 | Qian ................ | 370/432 |
| 7,474,676 B2 | * | 1/2009 | Tao et al. ................ | 370/469 |
| 7,609,724 B1 | * | 10/2009 | Frederiks et al. ................ | 370/473 |
| 2003/0133427 A1 | * | 7/2003 | Cimini et al. ................ | 370/338 |
| 2004/0120292 A1 | * | 6/2004 | Trainin ................ | 370/338 |
| 2005/0053037 A1 | * | 3/2005 | Ginzburg et al. ................ | 370/333 |
| 2005/0053066 A1 | * | 3/2005 | Famolari ................ | 370/389 |
| 2006/0133424 A1 | * | 6/2006 | Han et al. ................ | 370/474 |

* cited by examiner

*Primary Examiner*—Sharad Rampuria
(74) *Attorney, Agent, or Firm*—Eschweller & Associates, LLC

(57) ABSTRACT

A device and a method for transmitting a MAC service data unit (MSDU) in a network system are disclosed. The MSDU has a plurality of pieces of frame data. The method includes receiving the pieces of frame data of the MSDU; and when finishing receiving each piece of frame data, even if not all of the pieces of frame data of the MSDU have been received, converting the received piece of frame data into a MAC protocol data unit (MPDU) and outputting the MPDU.

7 Claims, 8 Drawing Sheets

DEVICE AND METHOD THEREOF FOR TRANSMITTING A MAC SERVICE DATA UNIT IN A NETWORK SYSTEM

BACKGROUND OF INVENTION

1. Field of the Invention

The present invention is related to a network device and a method thereof for transmitting data in a network system, and more particularly to a network device and a method thereof for transmitting a MAC service data unit (MSDU) in a network system.

2. Description of the Prior Art

In today's modern information-age society, networks allow large amounts of data, information, multimedia and knowledge, in the form of digital electronic signals to be transferred and exchanged. This promotes greater interpersonal communication, accumulation of experience, knowledge exchange, and technological advancement. Thus, networks have already become a foundation of the modern information-age society. Wired networks already having broad and almost universal acceptance, wireless networks are now also rapidly being developed. Wired networks are typically more stable and can ensure safety and privacy of information. Wireless networks, on the other hand, break free from the chains of wired transmission, allowing users to access information sources at any time and in any place, in a mobile and portable way. As wired and wireless networks each have their respective advantages, it has become a priority of information technologists to allow users to access both types of networks at a lower cost and with more effective resources for a networked device.

Please refer to FIG. 1, which is a block diagram of a wireless network device 20 connected to a terminal 10 according to the prior art. A terminal 10 connects with the wireless network device 20, which is a device following the WLAN specification of IEEE 802.11, such as a wireless network adapter or an access point. The wireless network device 20 comprises a buffer 22 for storing data, a control circuit 24 for controlling operations of the wireless network device 20, and an antenna 26 for wirelessly transmitting and receiving data.

During the period when the terminal 10 transmits data to other wireless device via the wireless network device 20, first data is transmitted to the wireless network device 20 to be processed. When the wireless network device 20 receives the data from the terminal 10, the control circuit 24 controls the antenna 26 to convert the received data into radio signals so that the data from the terminal 10 can be wirelessly outputted. According to the IEEE 802.11 specification, a MAC service data unit (MSDU) is the fundamental unit for transmitting data. Therefore, during the period when the terminal 10 transmits data to the wireless network device 20, the terminal 10 first converts data into a plurality of MSDUs and then transmits the MSDUs to the wireless network device 20. Moreover, because of the noise of wireless communication, it is improper for the wireless network device 20 to transmit any MSDU having an excessively long data length. Thus, when the control circuit 24 detects too much noise of the communication environment, the control circuit 24 separates each received MSDU into a plurality of MAC protocol data units (MPDUs), each MPDU having a shorter data length than the MSDU. By using the MPDU format, data can be transmitted more easily.

Please refer to FIGS. 2-3. FIG. 2 shows how the wireless network device 20 shown in FIG. 1 converts a MSDU 28 received from the terminal 10 into a plurality of MPDUs 32a-32c. FIG. 3 is a flow chart showing how the wireless network device 20 processes the MSDU 28. The MSDU 28 comprises a plurality of pieces of frame data 30a-30c. The terminal 10 appends a header to the MSDU 28, where the header includes source MAC address and destination MAC address, along with other relevant data. When the wireless network device 20 receives the MSDU 28 from the terminal 10, the wireless network device 20 stores the received MSDU 28 in the buffer 22 (steps 40 and 42). While receiving the MSDU 28, the control circuit 24 of the wireless network device 20 determines whether all pieces of frame data 30a-30c of the MSDU 28 have been received completely (step 44). The wireless network device 20 will not stop receiving the MSDU 28 until the MSDU 28 has been completely received. After completely receiving the MSDU 28, if the control circuit 24 detects excessive noise in the communication environment, the control circuit 28 separates the MSDU 28 stored in the buffer 22 to generate a plurality of MPDUs 32a-32c according to corresponding pieces of frame data 30a-30c (step 46). For instance, the control circuit 24 respectively converts the pieces of frame data 30a, 30b, and 30c into MPDU 32a, MPDU 32b, and MPDU 32c. After the pieces of frame data 30a-30c are converted into MPDUs 32a-32c, the control circuit 24 controls the antenna 26 to transfer the MPDUs 32a-32c into corresponding radio signals and to output the radio signals (step 48). After the antenna outputs the radio signals, the transfer of the MSDU 28 is finished (step 50).

Please refer to FIG. 4, which is a timing diagram shows how the buffer 22 and control circuit 24 shown in FIG. 1 process the pieces of frame data 30a-30c. As shown in FIG. 3, the control circuit 24 does not convert any piece of frame data 30a-30c stored in the buffer 22 into the MPDUs 32a-32c until the control circuit 24 completely receives all the pieces of frame data 30a-30c of the MSDU 28. Therefore, if any piece of frame data 30a-30c is not received by the wireless network device 20, the control circuit 24 does not start to convert the pieces of frame data 30a-30c into MPDUs 32a-32c. As shown in FIG. 4, the control circuit 24 starts to convert the pieces of frame data 30a-30c into the MPDUs 32a-32c after all pieces of frame data 30a-30c of the MSDU 28 have been stored in the buffer 22. However, because the control circuit 24 does not separate the MSDU 28 into the MPDUs 32a-32c until the wireless network device completely receives the MSDU 28, the processing of the wireless network device 20 for transmitting MSDU 28 is limited.

SUMMARY OF INVENTION

It is therefore a primary objective of the claimed invention to provide a device and a method for transmitting a MAC service data unit (MSDU) in a network system to solve the problem mentioned above.

Briefly summarized, the present invention provides a network device and relating operating method. The network device comprises an I/O interface, a buffer, and a control circuit. The I/O interface is used to receive a MAC service data unit (MSDU) that has a plurality of pieces of frame data. The buffer is used to store the pieces of frame data received by the I/O interface, and the control circuit is used to control the operations of the network device and to convert the pieces of frame data stored in the buffer into MAC protocol data units (MPDUs).

According to the method, each time the I/O interface finishes receiving each piece of frame data, even if the I/O interface has not received all the pieces of frame data of the MSDU, the control circuit converts the received piece of frame data into a corresponding MPDU and outputs the corresponding MPDU. In this way, the performance of the network device is better than the prior art network device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
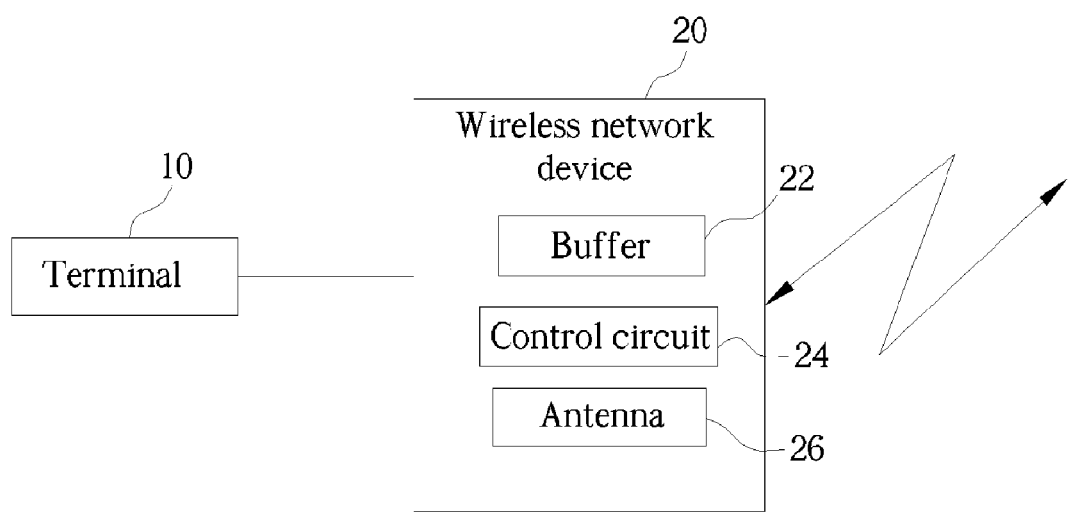
FIG. 1 is a block diagram of a wireless network device connected to a terminal according to the prior art.
Figure 2:
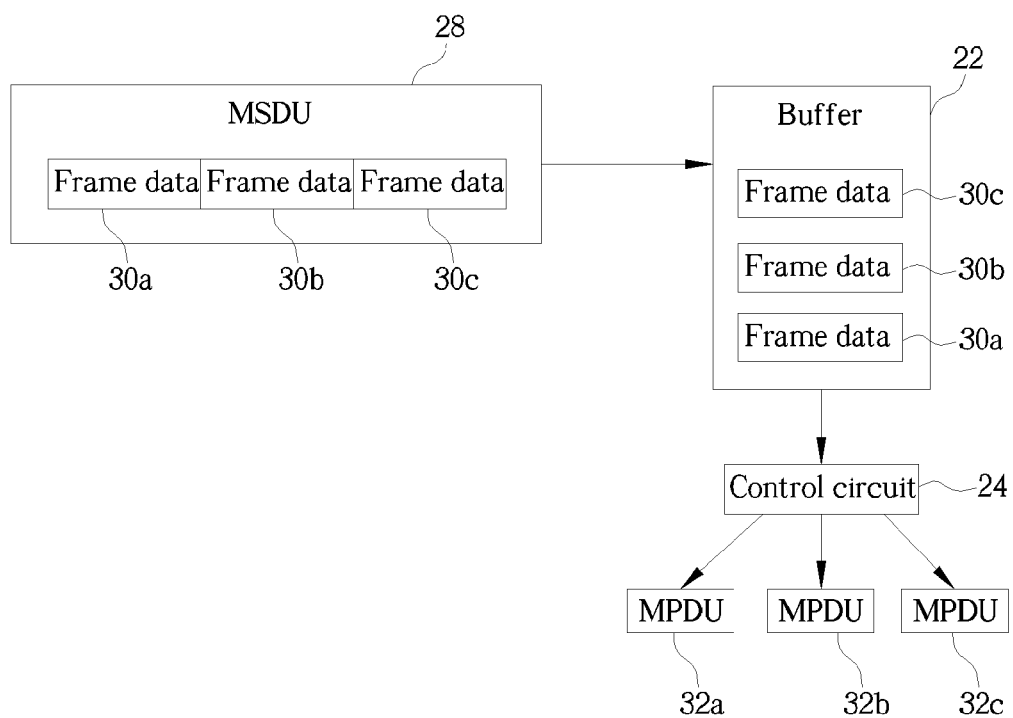
FIG. 2 shows how the wireless network device shown in FIG. 1 converts a MSDU received from the terminal into a plurality of MPDUS.
Figure 3:
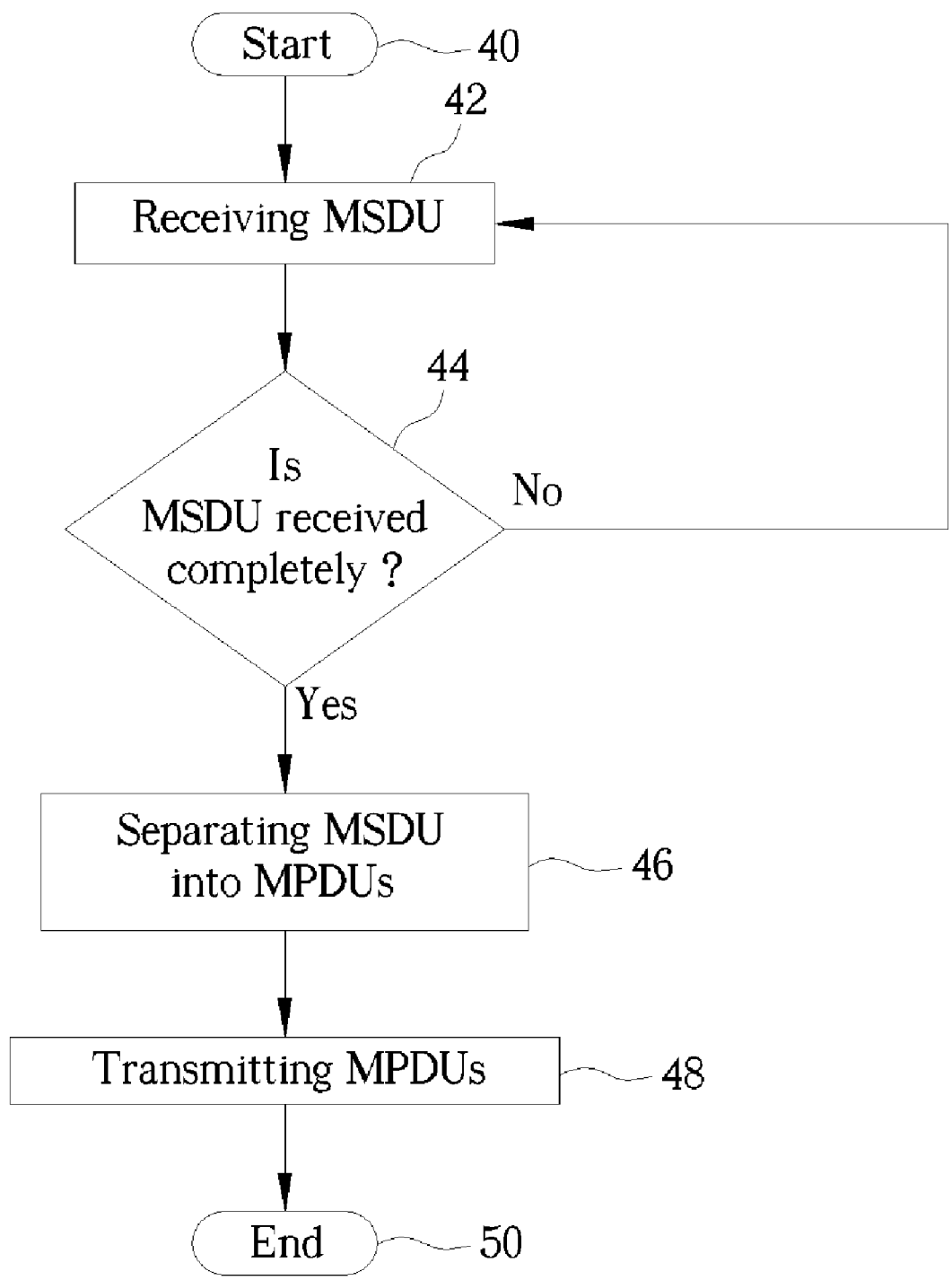
FIG. 3 is a flow chart showing how the wireless network device processes the MSDU.
Figure 5:
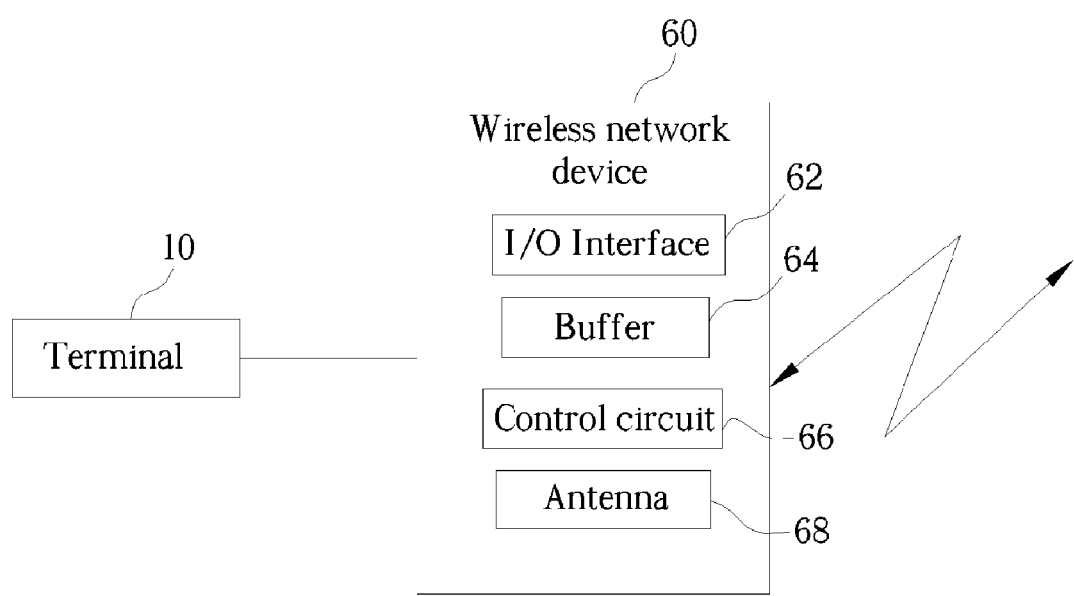
FIG. 5 is a block diagram of a network device connected to the terminal 10 shown in FIG. 1 according to the present invention.

Please refer to FIG. 5, which is a block diagram of a network device 60 connected to the terminal 10 shown in FIG. 1 according to the present invention. In this embodiment, the network device 60 is a wireless network device capable of transmitting data wirelessly, but the present invention is not limited by this embodiment. In order to describe the differences between the wireless network devices 20 and 60, FIG. 5 shows the wireless network device 60 connected to the terminal 10 shown in FIG. 1. Similar to the wireless network device 20, the wireless network device 60 follows the WLAN specification of IEEE 802.11 and can be a wireless network adapter or an access point. The wireless network device 60 comprises an I/O interface, a buffer 64, a control circuit 66, and an antenna 68. The I/O interface 62 is used for receiving MSDUs from the terminal 10, and the buffer 64 is used for storing data. The control circuit 66 is used for controlling the operations of the wireless network device 60, and the antenna 68 is used for transmitting and receiving data wirelessly.

Similar to the wireless network device 20, when the terminal 10 transmits data to another device via the wireless network device 60, the wireless network device 60 receives data from the terminal 10 and then the control circuit 66 controls the antenna 68 to convert the received data into radio signals so as to wirelessly output the received data. The terminal 10 transmits data to the wireless network device 60 according to the IEEE 802.11 specification. The fundamental data transmission unit of the terminal 10 is an MSDU so that the outputted data of the terminal 10 is converted into a plurality MSDUs in advance before transmission to the wireless network device 60. Each of the outputted MSDUs also comprises a plurality of pieces of frame data. When the wireless network device 60 receives the pieces of frame data from the terminal 10, the control circuit 66 converts the pieces of frame data into corresponding MPDUs and then wirelessly outputs the MPDUs via the antenna 68.

Figure 6:
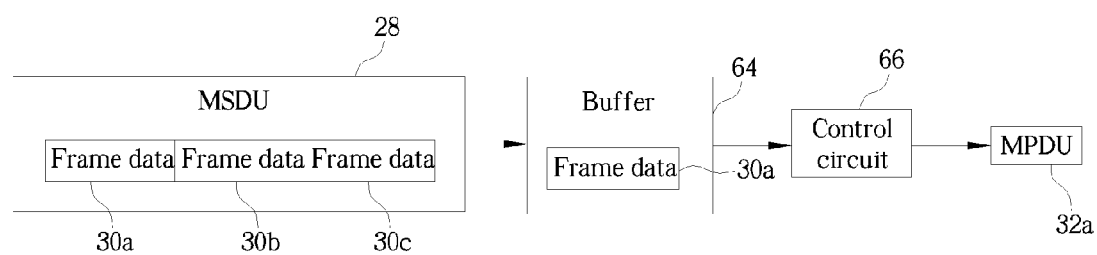
FIG. 6 shows how the wireless network device shown in FIG. 5 processes a MSDU received from the terminal shown in FIG. 1.
Figure 7:
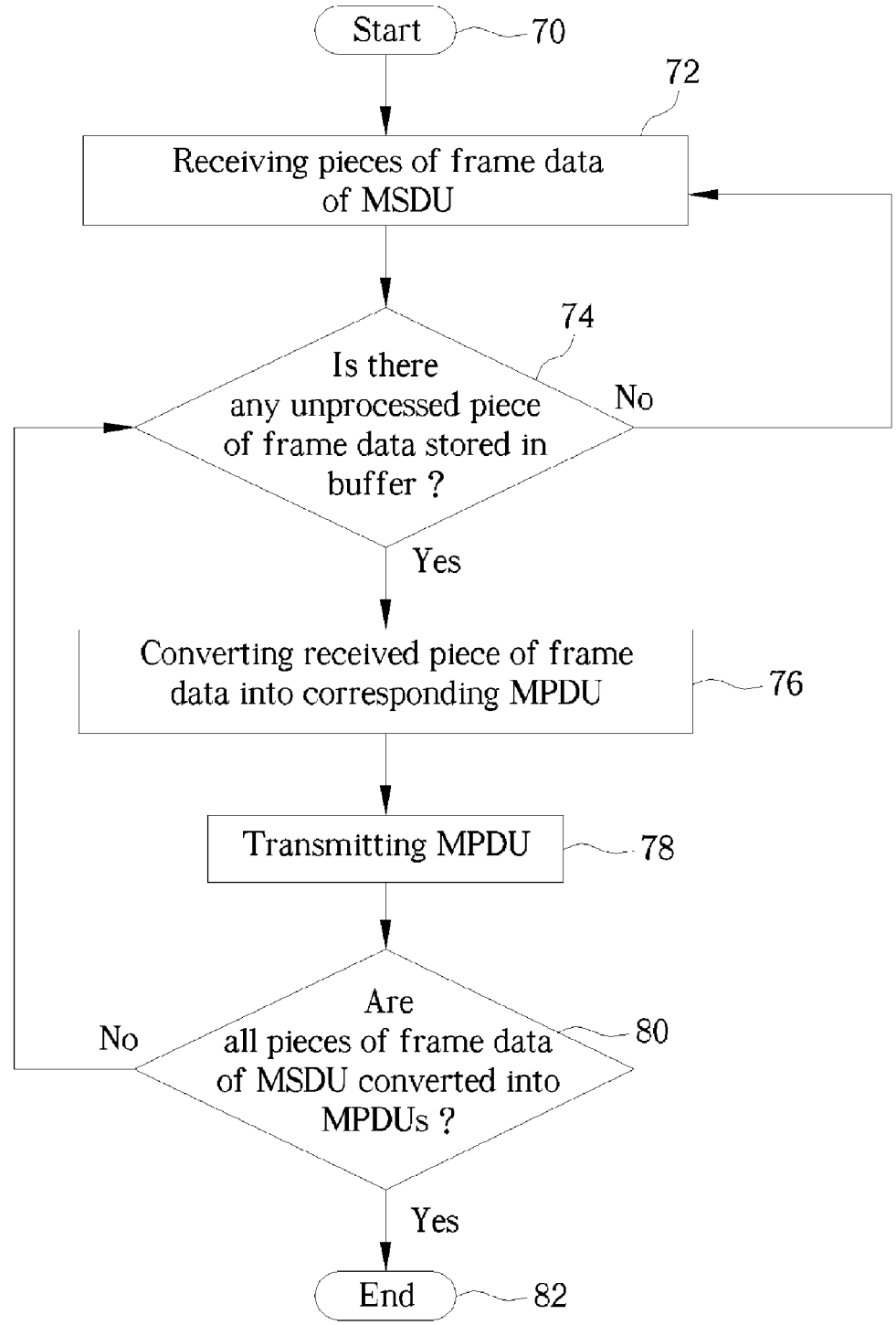
FIG. 7 is a flow chart showing how the wireless network device shown in FIG. 5 processes the received MSDU.

Please refer to FIGS. 6-7. FIG. 6 shows how the wireless network device 60 processes the MSDU 28 received from the terminal 10, and FIG. 7 is a flow chart showing how the wireless network device 60 processes the received MSDU 28. The MSDU 28 also comprises a plurality of pieces of frame data 30a-30c. The terminal 10 appends a header to the MSDU 28, where the header includes a source MAC address, and a destination MAC address, along with other relevant data. When the wireless network device 60 receives the pieces of frame data 30a-30c from the terminal 10, the wireless network device 60 stores the received pieces of frame data 30a-30c in the buffer 64 (steps 70 and 72). Unlike the wireless network device 20, every time the I/O interface 62 finishes receiving a piece of frame data 30a-30c, even if the I/O interface 62 does not receive all of the pieces of frame data 30a, 30b, or 30c of the MSDU 28, the control circuit 66 of the wireless network device 60 converts the received piece of frame data 30a, 30b, or 30c into a corresponding MPDU 32a, 32b, or 32c and outputs the corresponding MPDU 32a, 32b, or 32c. For example, as shown in FIG. 6, when the wireless network device 60 only receives the piece of frame data 30a of the MSDU 28, the control circuit 66 does not wait for the I/O interface 62 to completely receive all of the pieces of frame data 30a-30c of the MSDU 28, and converts the received pieces of frame data 30a into a MPDU 32a in advance and then wirelessly outputs the MPDU 32a via the antenna 68. Therefore, during the period when the I/O interface 62 receives the pieces of frame data 30a-30c from the terminal 10, the control circuit 66 determines in real-time whether any piece of unprocessed frame data 30a-30c of the MSDU 28 has been stored in the buffer 64 (step 74). If there is not any piece of unprocessed frame data 30a, 30b, or 30c stored in the buffer 64, the control circuit 66 halts the process for converting data into MPDUs. If there is an unprocessed piece of frame data 30a, 30b, or 30c stored in the buffer 64, the control circuit 66 converts the unprocessed piece of frame data 30a, 30b, or 30c stored in the buffer 64 into a corresponding MPDU (step 76), and then controls the antenna 68 to wirelessly output the corresponding MPDU (step 78). After the control circuit 66 controls the antenna 68 to output the MPDU, the control circuit 66 determines whether all the pieces of frame data 30a-30c have been converted into MPDUs and wirelessly outputted (step 80). If all the pieces of frame data 30a-30c have not been converted into MPDUs or have not been outputted, then step 74 is executed again, otherwise the process for transmitting the MSDU 28 via the wireless network device 60 is ended (step 82).

Figure 4:
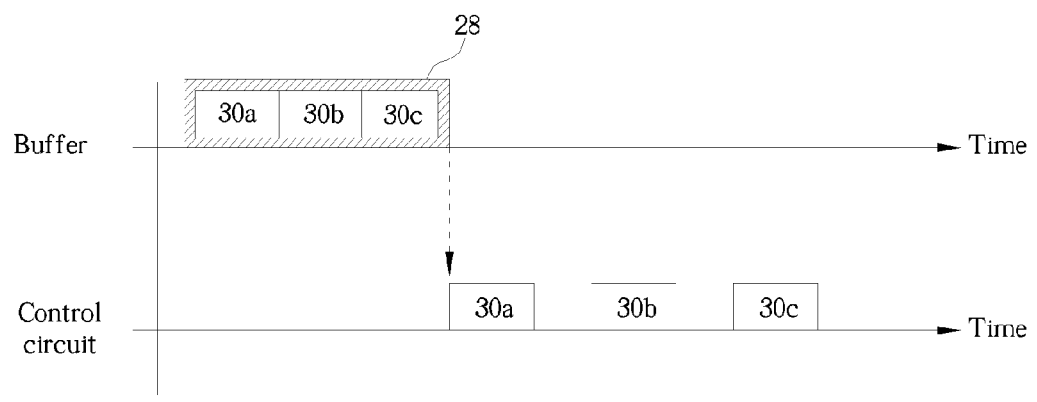
FIG. 4 is a timing diagram showing how the buffer and control circuit shown in FIG. 1 process the pieces of frame data.
Figure 8:
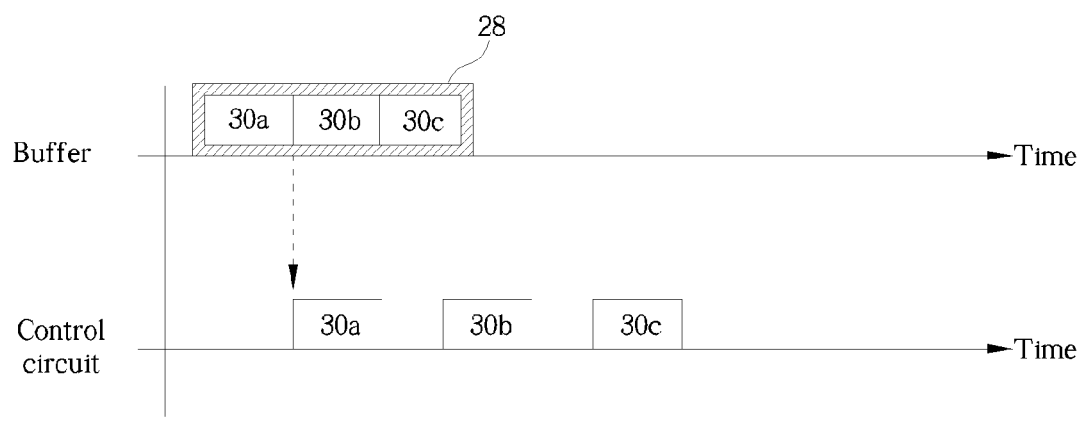
FIG. 8 is a timing diagram showing how the buffer and the control circuit shown in FIG. 5 process the pieces of frame data.

Please refer to FIG. 8 and FIG. 4. FIG. 8 is a timing diagram showing how the buffer 64 and the control circuit 66 process the pieces of frame data 30a-30c. As mentioned previously, each time when the I/O interface 62 finishes receiving any piece of frame data 30a-30c, even if the I/O interface 62 does not receive all of the pieces of frame data 30a, 30b, or 30c of the MSDU 28, the control circuit 66 converts the received piece of frame data 30a, 30b, or 30c into a corresponding MPDU 32a, 32b, or 32c and outputs the corresponding MPDU 32a, 32b, or 32c. As shown in FIG. 8, the control circuit 66 begins to convert the piece of frame data 30a into the corresponding MPDU 32a since the piece of frame data 30a is stored in the buffer 64. It should be noted that the other two pieces of frame data 30b and 30c have not been stored in the buffer 64 at the same time. Therefore, because the control circuit 66 of the wireless network device 60 begins to convert the pieces of frame data 30a-30c into MPDUs 32a-32c without out waiting for all the pieces of frame data 30a-30c, the performance of the wireless network device 60 is better than that of the prior art wireless network device 20.

In contrast to the prior art, the network device according to the present invention begins to convert the received piece of frame data into a corresponding MPDU and outputs the corresponding MPDU without receiving all the pieces of frame data of the MSDU. As such, the efficiency of transmitting MSDUs is improved.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for transmitting a MAC service data unit (MSDU) in a network system, the MSDU having a plurality of pieces of frame data, the method comprising:
   receiving the pieces of frame data of the MSDU; and
   converting any received piece of frame data into a MAC protocol data unit (MPDU) and outputting the MPDU every time a piece of frame data is received, wherein for at least one of the plurality of pieces of frame data, converting begins prior to having received all of the plurality of pieces of frame data of the MSDU.

2. The method of claim 1 wherein the network system is a wireless network system.

3. The method of claim 2 wherein the received piece of frame data is converted into the MPDU according to the IEEE 802.11 standard.

4. A network device comprising:
   an I/O interface to receive a MAC service data unit (MSDU) which has a plurality of pieces of frame data;
   a buffer to store the pieces of frame data received by the I/O interface; and
   a control circuit to control operations of the network device and to convert any piece of the pieces of frame data stored in the buffer into MAC protocol data units (MPDUs) every time a piece of frame data is received;
   wherein the control circuit is configured to begin converting at least one received piece of frame data into a corresponding MPDU prior to having received all of the plurality of pieces of frame data of the MSDU.

5. The network device of claim 4 further comprising an antenna for wirelessly transmitting the MPDUs.

6. The network device of claim 5 wherein the control circuit converts the pieces of frame data of the MSDU into the MSDUs according to the IEEE 802.11 standard.

7. A device comprising:
   an interface to receive a MAC service data unit (MSDU), the MSDU comprising a plurality of pieces of data; and
   a controller to convert any piece of the plurality of pieces of data into MAC protocol data units (MPDU) every time a piece of frame data is received, the controller being configured to begin converting at least one received piece of data into a corresponding MPDU prior to having received all of the plurality of pieces of data of the MSDU.

* * * * *